| United States Patent [19] | [11] | 4,172,930 |
|---|---|---|
| Kajitani et al. | [45] | Oct. 30, 1979 |

[54] SIZES FOR TEXTILE FIBERS

[75] Inventors: Koichi Kajitani; Tohei Moritani; Koji Moritani; Makoto Shiraishi, all of Kurashiki, Japan

[73] Assignee: Kuraray Co., Ltd., Kurashiki, Japan

[21] Appl. No.: 884,287

[22] Filed: Mar. 7, 1978

[30] Foreign Application Priority Data

Mar. 7, 1977 [JP] Japan .................................. 52-25774

[51] Int. Cl.$^2$ .......................................... C08F 216/06
[52] U.S. Cl. .................................. 525/56; 260/29.6 B; 260/29.6 H; 260/29.6 WA; 427/390 R; 428/483; 525/62
[58] Field of Search ............................................. 526/7

[56] References Cited

U.S. PATENT DOCUMENTS

| 3,409,598 | 11/1968 | Takigawa et al. | 526/8 |
| 3,689,469 | 9/1972 | Inskip et al. | 260/86.1 |
| 3,839,307 | 10/1974 | Schmieg | 526/8 |

Primary Examiner—Stanford M. Levin
Attorney, Agent, or Firm—Oblon, Fisher, Spivak, McClelland & Maier

[57] ABSTRACT

A size for textile fiber which comprises a modified polyvinyl alcohol type resin obtainable by the alkali saponification of a copolymer comprising a vinyl ester and an ethylenically unsaturated dicarboxylic acid substantially free from the monoester, diester and anhydride as essential and predominant copolymeric units. The size has excellent adhesive and cohesive strengths with respect to textile fibers as well as superior desizing properties and workability.

6 Claims, No Drawings

SIZES FOR TEXTILE FIBERS

BACKGROUND OF THE INVENTION

1. Field of the Invention

This invention relates to a size for textile fibers. More particularly, the invention relates to a novel size for textile fibers which comprises a modified polyvinyl alcohol type resin obtainable by the alkali saponification of a copolymer comprising a vinyl ester, typically vinyl acetate, and an ethylenically unsaturated dicarboxylic acid substantially free from the monoester, diester and anhydride as essential and predominant copolymeric units, which size has excellent adhesive and cohesive affinities for textile fibers as well as improved desizing properties and workability.

2. Description of the Prior Art

Whereas starch, polyvinyl alcohol, acrylic copolymers, etc. are conventional textile sizes, those sizes have their own disadvantages and cannot be used alone successfully with different kinds of textile fibers. This has compelled one to use two or more of such sizes in various formulations. The problems encountered when two or more different sizes are used in combination include the instability of the resultant composition size due to the poor compatibility of component sizes, the poor desizing efficiency arising from the dissimilar optimum desizing conditions for component sizes, the complexity of treatment of desizing effluents, etc. Recently, in particular, the disposal of waste water has become an important consideration from the standpoint of environmental protection.

The continued use of mixed sizes notwithstanding the above problems is because no single known size is able to discharge the multiple functions required of sizes for textile fibers. The characteristics of the representative commercial textile sizes heretofore in use are set forth in the following table.

| Characteristics | Starch | Polyvinyl alcohol | Acrylate size |
|---|---|---|---|
| (1) Cost | ⊚ | O | x |
| (2) Properties of size film | x | ⊚ | O |
| (3) Adhesion to synthetic fiber | x | x | O |
| (4) Stripping of size on weaving | x | O | O |
| (5) Gumming up tendency | O | O | x |
| (6) Odor of size solution | O | O | x |
| (7) Stability of size solution | x | O | O |
| (8) Treatment of desizing effluent | O | O | x |

⊚Very desirable.
O Desirable.
X Undesirable

It will be apparent that while starch is the oldest, commonest and least expensive size of all, it ranks very low in functional terms, for it gives only a harsh and brittle film. Often called "synthetic starch," polyvinyl alcohol is a water-soluble synthetic high molecular weight substance containing a large number of hydroxyl radicals just as does starch. Because it yields a considerably tougher film than starch, with excellent cohesive and protective properties with respect to fiber, polyvinyl alcohol has rapidly come into use, replacing starch, as a textile size over the past decade or so.

Nonetheless, polyvinyl alcohol sizes have one disadvantage; i.e. an inadequate "bonding" or adhesive affinity for synthetic fiber. The acrylate size, on the other hand, has a property compensating for the above disadvantage of polyvinyl alcohol, that is an excellent adhesive affinity for synthetic fiber. However, this size is not only expensive but, because of the several disadvantages mentioned above, is rarely employed alone. Thus, acrylate size has been added as a modifier to starch or polyvinyl alcohol sizes for the purpose of increasing their adhesive affinity for synthetic fiber. Furthermore, both starch and polyvinyl alcohol are able to be microbiologically degraded and, as such, lend themselves well to the treatment of desizing effluents. In the case of acrylate sizes, no suitable strain of microorganism has been discovered that would degrade them and, therefore, in consideration of effluent disposal, it is preferable not to add an acrylate size.

In view of the current status of textile sizes, it was thought that if it were possible to overcome the disadvantage of polyvinyl alcohol size, i.e. its low adhesive affinity for synthetic fiber, so that the size could be utilized without the addition of an acrylate size, a considerable commercial advance could be materialized. From the above point of view, several proposals have been made as to the improvement of sizing characteristics by the modification of polyvinyl alcohol by way of copolymerization.

By way of illustration, it is stated in Japanese Patent Publication No. 5978/1964 that a textile size based on a resin which is obtainable by partial or complete saponification of the vinyl acetate units in the copolymer of vinyl acetate with at least a comonomer selected from the group consisting of unsaturated aliphatic dicarboxylic acid dialkyl esters, acrylic acid alkyl esters and vinyl alkyl ethers and at least a member selected from the group consisting of unsaturated aliphatic dicarboxylic acid monoalkyl esters has superior properties.

It is disclosed in Japanese Patent Publication No. 7060/1968 that a saponification product of a crotonic acid-olefin-vinyl acetate copolymer is a suitable size for hydrophobic fibers.

Japanese Patent Application Laid-open No. 66988/1974 states that a partial saponification product of a maleic acid monoalkyl ester-vinyl acetate copolymer within a certain range is a size suitable for hydrophobic fibers.

Japanese Patent Publication No. 32355/1975 discloses a textile size based on a modified polyvinyl alcohol containing 0.1 to 15 mole percent of lactone rings within its molecule and teaches a method for producing the same which comprises saponifying an unsaturated carboxylic acid ester-vinyl acetate copolymer and neutralizing the saponified copolymer partially with an acid.

U.S. Pat. No. 3,689,469 teaches that a saponified vinyl acetate-methyl methacrylate copolymer having a specified composition and essentially "free from acid" in its molecule is a suitable size for textile fibers and shows that the presence in the copolymer of acid leads to deteriorations in desizing properties. This specification further includes a description suggesting that, in the saponified copolymer, all the carboxyl groups derived from the methyl methacrylate units form intra-molecular esters lactones with the hydroxyl groups of the adjacent vinyl alcohol units.

The adhesive affinities for synthetic fibers of the polyvinyl alcohol type resin prepared by the copolymerization and modification with an unsaturated carboxylic acid alkyl ester or crotonic acid and an olefin or the like are still inadequate and are useful only in limited applications when used alone. Thus, in many general applications, such resins cannot discharge the functions required of a textile size as far as they are singly employed, it being thus still essential to enlist the help of an acrylate size component.

DETAILED DESCRIPTION OF THE INVENTION

The intensive research into the modification of polyvinyl alcohol resins and the applicability of modified resins to textile size uses led us to the finding that a modified polyvinyl alcohol resin obtainable by an alkali saponification of a copolymer containing a vinyl ester and an ethylenically unsaturated dicarboxylic acid as essential and predominant copolymeric units has an adhesive affinity as high as 10 to 100 times that of ordinary polyvinyl alcohol resin and even surpassing the adhesive power of acrylate sizes, as well as unusually desirable desizing properties. This invention has been developed on the basis of the above finding.

This invention, thus, provides a practical and inexpensive single-component size formulation based on a polyvinyl alcohol type resin alone, without the adjunctive use of an acrylate size component, and, therefore, has a considerable commercial significance.

The vinyl esters employable in the practice of this invention include vinyl acetate, vinyl propionate, vinyl formate, etc., although vinyl acetate is normally employed with advantage.

The modified polyvinyl alcohol resin according to this invention can be produced, for example from itaconic acid which is substantially free from its ester and anhydride forms on the one hand and vinyl acetate as a typical species of vinyl ester on the other hand, by the procedure set out hereinafter.

In the first place, the above-mentioned two monomers are radical-polymerized in an alcoholic solvent. In order to obtain a copolymer with homogeneous composition, a sequential control of the reaction is desirable so that the ratio of one monomer to the other monomer within the reaction system will be kept constant. After this reaction, the resultant copolymer is saponified under alkaline conditions. Hydrolysis with the aid of an aqueous solution of alkali metal hydroxide and alcoholysis with a basic catalyst may be mentioned as typical methods for this alkali saponification. Commercially, methanolysis with the use of sodium methoxide or sodium hydroxide is most desirable. Acid saponification is not preferable in this invention in view of the fact that the carboxyl groups in the side chain are liable to form intramolecular esters, i.e. lactone rings, thus interfering with the solubility and desizing properties of the product resin.

The ethylenically unsaturated dicarboxylic acid which is employed as a copolymeric component in the production of the modified polyvinyl alcohol resin for the textile size according to this invention must be substantially free from the corresponding monoester, diester and anhydride. It is also desirable to preclude, as far as possible, the presence of unsaturated carboxylic acid esters as an impurity or third component. This is because the ester structure in the product resin would undergo a transesterification reaction in the course of drying or handling to produce inter-molecular cross-linking, thus adversely affecting the water solubility of the resin and considerably impairing the sizing properties of the product.

While the ethylenically unsaturated dicarboxylic acid may for example be itaconic acid, maleic acid, fumaric acid, glutaconic acid or allylmalonic acid, the former three acids are desirable from availability points of view. Of them all, itaconic acid is conducive to a particularly excellent adhesive performance.

The proportion of the ethylenically unsaturated dicarboxylic acid, especially itaconic acid, in the copolymer should be selected with reference to the substrate fiber to be sized and the specific object of sizing, and it is normally desirable to employ this component in the range of 0.1 to 10 mole percent and, for still better results, in the range of 0.5 to 5 mole percent. No improvement will be obtained if the proportion of ethylenically unsaturated dicarboxylic acid in the copolymer is below the above-mentioned lower limit, while a proportion in excess of the upper limit will result in an excessive moisture-sensitivity of the product. Furthermore, as regards the third comonomeric component used in addition to the vinyl ester which is typically vinyl acetate and the ethylenically unsaturated dicarboxylic acid, its type and proportional amount may be selected insofar as such third component does not adversely affect the basic requirements of a textile size such as the water solubility and adhesion (cohesion with respect to fiber) of the product resin. The textile size according to this invention has a well-balanced combination of the characteristics desired in all the stages involved in the production and related processes for textile size and textile-sizing applications, such as the solubility, low-foaming property, odor and compatibility with other sizes and auxiliary agents in the preparation of a size solution, the low-foaming, low-skinning, wet-dividing and yarn-penetrating properties in the sizing process, the color and degradation characteristics in the drying stage, divisibility in the dividing process, the desizing property, reduced gum-up tendency, sufficient cohesion and adequate flexibility in the weaving stage, solubility in the desizing process and the biodegradation performance in the activated sludge treatment of desizing effluents, and so forth. The most outstanding of all these features is that the size according to this invention is considerably superior to the conventional polyvinyl alcohol resin in adhesive affinity for polyester fiber. It is considered that this high adhesive affinity coupled with its adequate flexibility results in an increased cohesive strength leading to the excellent weaving performance obtainable with the present textile size.

No other textile size heretofore available has such a multiplicity of desirable size characteristics in a well-balanced combination and this excellent combination of characteristics has been provided only for the first time by the textile size according to this invention.

While it is not clear to us as yet why the above-mentioned superior combination of characteristics has been brought about in the textile size of this invention, we believe that the use of an ethylenically unsaturated dicarboxylic acid, particularly itaconic acid, as a copolymeric component with polyvinyl alcohol is at least partially responsible. Thus, because the ethylenically unsaturated dicarboxylic acid to be used for the polymerization stage is substantially free from the monoester, diester and anhydride and because an alkali saponification process is employed for the subsequent saponification of the copolymer, it is presumed that the side chains of the copolymer contain paired carboxylic acid groups derived from the copolymerized ethylenically unsaturated dicarboxylic acid and these side-chain carboxylic acid groups are present in the form of carboxylic acid salts substantially without assuming the intramolecular or intermolecular ester structure, thus providing basically desirable influences upon the various characteristics desired in a textile size.

The degree of saponification of the alkali-saponified copolymer used in the textile size of this invention is desirably selected with reference to the type of substrate fiber, the type of woven product desired, sizing machine, weaving machine, etc. When the fiber to be sized is a filament fiber, a sufficient cohesive strength, i.e. bundling property in particular, is required and, hence, it is appropriate to select a degree of saponification within the range of 30 to 95 mole percent so that the size may display adequate flexibility and adhesive strength. Degrees of saponification below 30 mole percent are not employable because it would then be impossible to obtain a suitable balance between the water solubility and hygroscopicity of the size. Approaching a complete saponification beyond the upper limit of 95 mole percent results in tendencies toward reduced flexibility and adhesion, and is thus generally undesirable. When the filament fiber to be sized is a hydrophobic fiber such as polypropylene, polyester and polyamide etc., it is more preferable to select the degree of saponification in the range of 60 to 85 mole percent.

When the fiber to be sized is a staple fiber, the cohesion characteristics of the size such as fluff-binding property and the desizing, gum-up and other performances of the size at the weaving step must be important considerations. In view of these considerations and the compatibility of the size with starch which is commonly used in combination with polyvinyl alcohol sizes, it is appropriate to select a degree of saponification within the range of 70 to 100 mole percent. When the selected degree of saponification is below 70 mole percent, the size film will be too soft, thus causing the gum-up problem. Moreover, the compatibility with starch is rather adversely affected when the degree of saponification is too low.

The textile size based on the special modified polyvinyl alcohol resin according to this invention includes sizes having varying physical properties and, therefore, is fully able to deal with various types of fiber within the mono-component formula specified in the present invention. It is, however, permissible, if so desired, to employ the present size in combination with various known sizing agents such as starch, polyvinyl alcohol, modified polyvinyl alcohol, acrylic sizes, and the like.

The following examples are intended to further illustrate this invention and should by no means be construed as limiting the scope of the invention.

EXAMPLE 1

Vinyl acetate and one of various unsaturated aliphatic carboxylic acids (or acid esters) were radical-polymerized in methanol by the delayed feeding method and, after the addition of a polymerization inhibitor, the unreacted monomers were removed azeotropically with methanol to obtain a methanolic solution of the corresponding modified polyvinyl acetate. This solution was saponified by the addition of a methanolic solution containing a pre-calculated amount of sodium hydroxide at 40° C. for a predetermined time. With the progress of saponification, the reaction system gained in viscosity until a polyvinyl alcohol gel precipitated out to give a non-homogeneous system. The gel was roughly fragmented, washed well with methanol, methyl acetate, acetone or the like, dried in the air at room temperature and further dried under reduced pressure at 50° C. The dried gel was mechanically pulverized and further dried. By the above procedure was obtained a sample powder of the modified polyvinyl alcohol resin.

Each of the powders obtained in the above manner was used for various analyses and as a sample for the evaluation of film properties.

First, each sample powder was dissolved in a sufficient amount of water to give a concentration of 10 to 20 weight percent. In the preparation of this concentrated aqueous solution, mixing with a different size or/and auxiliary agent is also effected as necessary. The solution thus obtained is a size solution.

Then, this size solution was cast on a polyester film (Diafoil ® #100, Mitsubishi Resin Co., Ltd.) intimately wrapped around a hot drum (70° C.) having a circumference of 3 meters and dried in situ to produce a size film as thick as 50 microns. This laminated film was slit to suitable dimensions and heat-treated in a hot-current drier at 130° C. for 10 minutes, after which the size film was peeled off and tested for various physical properties. To measure the adhesive affinity of the size for polyester, the laminated film was cut into a rectangular piece and with a pressure-sensitive reinforcing tape stuck to the sized face of the laminated film, the size film was peeled off the polyester substratum. The peel strength thus measured was taken as the adhesive strength of the resin. The results are summarized in Table 1.

It will be readily seen from Table 1 that the present modified polyvinyl alcohol containing the ethylenically unsaturated dicarboxylic acid, which is exemplified by itaconic acid, has both excellent solubility after the heat-treatment and the necessary adhesive affinity for polyester and that this adhesive affinity, in particular, is remarkably high, that is more than 10 times that of the conventional polyvinyl alcohol. It is easy to see that the high adhesive affinity and excellent solubility are responsible for the high performance of the modified polyvinyl alcohol as a size for textile fiber.

The symbols and terms used in Table 1 have the meanings defined below.

1. Type of polymer used in the preparation of the size film: PLM
   CST: Corn starch
   ACR: Acrylic copolymer (Plus-size ® T-823, Go-oh Kagaku K.K.)
   PVA: Polyvinyl alcohol
   m-PVA: Modified polyvinyl alcohol
   s-PVA: Specially modified polyvinyl alcohol (the textile size according to this invention)
2. Type of comonomer used: COM
   MSA: Itaconic acid
   MAA: Maleic acid
   FMA: Fumaric acid
   CRA: Crotonic acid
   MAN: Maleic anhydride
   ACA: Acrylic acid
   MSD: Dimethyl itaconate
   ACM: Methyl acrylate
   MMA: Methyl methacrylate
3. Degree of modification: Δ
   The mole % of the unsaturated carboxylic acid (or ester) contained in the copolymer.

4. Apparent degree of polymerization: (DP) app
The substitute value for the degree of polymerization as calculated from the measured viscosity of a 4% aqueous solution of the saponified copolymer by means of the viscosity-degree of polymerization expression for the completely saponified polyvinyl alcohol.

5. Apparent degree of saponification: (DS) app
The apparent degree of saponification as calculated from the residual acetic acid content per unit weight of the size-film polymer as determined by titration on the assumption that the polymer is ordinary partially saponified polyvinyl alcohol. There are cases in which the maximum value is not equal to 100.

6. Solubility of the film: SOL
About 200 mg of the film heat-treated at 130° C. for 10 minutes is put in 200 ml of water and maintained as such at about 98° C. for 60 minutes. It is filtered through a glass filter, dried and weighed to arrive at the undissolved amount. The following evaluation scale is used: o when the undissolved amount was less than 1 mg; Δ when the undissolved amount was in the range of 1 to 5 mg; and x when the amount was more than 5 mg.

7. Adhesive affinity for polyester film: ADE
A laminated polyester/size film prepared by casting a size solution onto a polyester film and drying the solution was cut into a piece 25 by 150 mm and, after it had been reinforced with a pressure-sensitive adhesive tape across the sized side, the piece was peeled off longitudinally over a length of 100 mm and set in position on an autograph. The 180° peel strength of the sample was measured at the head speed of 50 mm/min. The sample was put in a chamber kept at 20° C. and 65% RH for 3 days before the test so that it would have absorbed moisture to a point of equilibrium. The figures are in the units of g/cm.

8.
*1: ACR:PVA (degree of polymerization 550, degree of saponification 88.0 mole %)=6:4(wt. ratio)
*2: Degree of polymerization 550, degree of saponification 88.0 mole %.
*3: Degree of polymerization 1750, degree of saponification 88.0 mole %.
*4: Degree of polymerization 1750, degree of saponification 98.5 mole %.
*5: Degree of polymerizaton 550, degree of saponification 79.5 mole %.

Table 1

| Trial No. | PLM | COM | Δ | (DP) app | (DS) app | SOL | ADE | |
|---|---|---|---|---|---|---|---|---|
| 1 | ACR | — | — | — | — | o | 110 | |
| 2 | ACR+PVA | — | — | — | — | o | 129 | *1 |
| 3 | S-PVA | MSA | 4.9 | 600 | 95 | o | 75 | |
| 4 | " | MSA | 4.9 | 600 | 88 | o | 110 | |
| 5 | " | MSA | 4.9 | 600 | 77 | o | 190 | |
| 6 | " | MSA | 4.9 | 600 | 65 | o | 230 | |
| 7 | " | MSA | 2.8 | 1800 | 80 | o | 150 | |
| 8 | " | MSA | 2.8 | 1800 | 97 | o | 45 | |
| 9 | " | MSA | 2.1 | 1300 | 67 | o | 214 | |
| 10 | " | MSA | 2.1 | 1300 | 94 | o | 65 | |
| 11 | " | MSA | 0.9 | 650 | 80 | o | 170 | |
| 12 | " | MAA | 0.9 | 650 | 88 | o | 100 | |
| 13 | " | MAA | 1.5 | 800 | 96 | o | 43 | |
| 14 | " | FMA | 1.5 | 700 | 88 | o | 90 | |
| 15 | PVA | — | — | 500 | 88 | o | 5 | *2 |
| 16 | " | — | — | 1700 | 88 | o | 6 | *3 |
| 17 | " | — | — | 1700 | 98 | o | 3 | *4 |
| 18 | " | — | — | 500 | 80 | o | 6 | *5 |
| 19 | m-PVA | MSD | 4.6 | 650 | 77 | x | 40 | |
| 20 | " | MSD | 1.1 | 1300 | 88 | x | 25 | |
| 21 | " | MAN | 3.5 | 1900 | 95 | o | 23 | |
| 22 | " | MAN | 3.5 | 1900 | 88 | x | 29 | |
| 23 | " | CRA | 5.3 | 850 | 90 | Δ | 18 | |
| 24 | " | ACA | 3.4 | 1100 | 93 | o | 11 | |
| 25 | " | ACM | 3.7 | 2000 | 93 | x | 8 | |
| 26 | " | MMA | 5.0 | 1800 | 95 | o | 13 | |
| 27 | " | MMA | 1.8 | 2100 | 86 | x | 6 | |
| 28 | CST | — | — | — | — | o | 0 | |

EXAMPLES 2 TO 9

Using a commercial compound size based on an acrylate size component which has been specifically formulated for adhesion to polyester fibers and which is commonly employed by the industry today and a compound size based on the specially modified polyvinyl alcohol according to this invention, size films were prepared and their physical properties determined for comparison by the same procedures as in Example 1. The properties are shown in Table 2. It will be seen that despite its being free from an acrylic component, the size according to this invention has a high adhesive affinity which is comparable to that of acrylate size and that this effect is essentially not lost even on addition of an auxiliary agent such as an antifoam in the oily preparation. The solubility data further suggest that the size according to this invention has excellent desizing properties.

Table 2

| Evaluation of Properties of Films obtained from Compound Size Solutions | | | | 20° C., 65% RH | |
|---|---|---|---|---|---|
| | | Size formula | Solubility * | Adhesive affinity | Tensile strength at break | Elongation at break |
| Control Example | 1 | A-1 | o | 100 | 1.7 | 143 |
| | 2 | A-2 | o | 70 | 1.4 | 137 |
| | 3 | A-3 | o | 137 | 1.5 | 160 |
| Example | 2 | B-2 | o | 200 | 1.1 | 400 |
| | 3 | B-3 | o | 185 | 1.1 | 380 |
| | 4 | B-4 | o | 130 | 1.6 | 290 |
| | 5 | B-5 | o | 120 | 1.9 | 330 |
| | 6 | B-6 | o | 220 | 0.9 | 230 |
| | 7 | B-7 | o | 82 | 2.1 | 190 |
| | 8 | B-8 | o | 105 | 1.8 | 280 |
| | 9 | B-9 | o | 110 | 2.7 | 290 |
| Reference Example | 1 | C-1 | o | 6 | 3.5 | 170 |
| | 2 | C-2 | o | 2 | 6.0 | 210 |
| | 3 | C-3 | o | 13 | 2.7 | 230 |
| | 4 | C-4 | x | 31 | 4.1 | 260 |
| | 5 | C-5 | x | 140 | 1.3 | 320 |

* o: The undissolved amount is less than 1 mg;
x: The undissolved amount is more than 5 mg.

The symbols and terms used in Table 2 have the meanings defined below.
Size formula:
   Principal size: 100 weight parts, total
   Lubricant: 0 or 5 weight parts
   Antifoam: 0 or 0.3 weight part
   The above solid components were dissolved in a predetermined amount of water (90° C., approx.) in the indicated order to prepare a size solution

| Size formula | Principal size (weight parts) | | Auxiliary agent | |
|---|---|---|---|---|
| | Acrylic copolymer (Go-oh Kagaku K.K., Plus-size T-823) | Polyvinyl alcohol (Degree of polymerization 550; degree of saponification 88.0 mole %) | Lubricant* | Antifoam** |
| A-1 | (71) | (29) | (0) | (0) |
| A-2 | (71) | (29) | (5) | (0.3) |
| A-3 | (100) | (0) | (5) | (0) |

*Sitex® T-190, Go-oh Kagaku K.K.
**A special nonionic surfactant

| Size formula | Principal size (weight parts) | | Auxiliary agents (weight parts) | |
|---|---|---|---|---|
| | Main size-1 (Polyvinyl alcohol) | Main size-2 | Lubricant (Higher aliphatic sulfate) | Antifoam 7 |
| C-1 | *1 (100) | (0) | (5) | (0.3) |
| C-2 | *2 (100) | (0) | (5) | (0.3) |
| C-3 | *3 ( 90) | *6 (10) | (5) | (0.3) |
| C-4 | *4 (100) | (0) | (5) | (0.3) |
| C-5 | *5 (100) | (0) | (5) | (0.3) |

*1 Degree of polymerization 550, degree of saponification 88.0 mole %
*2 Degree of polymerization 550, degree of saponification 79.5 mole %
*3 Degree of polymerization 550, degree of saponification 79.5 mole %
*4 The same modified polyvinyl alcohol as used in Trial No. 22 of Example 1.
*5 The same modified polyvinyl alcohol as used in Trial No. 19 of Example 1.
*6 An acrylic copolymer (Go-oh Kagaku, K.K., Plus-size® T-823)
*7 Pionin® K-16, Takemoto Yushi, K.K.

| Size formula | Principal size (weight parts) | | Auxiliary agent (weight parts) | |
|---|---|---|---|---|
| | (Note 1) Principal size-1 | Principal size-2 | Note Lubricant | (Note 3) Antifoam |
| B-2 | MSA-6(100) | | PX- 7(5) | (0.3) |
| B-3 | MSA- 6(100) | | T-190(5) | (0.3) |
| B-4 | MSA- 6(70) | Polyvinyl alcohol (Note 4) (30) | T-190(5) | (0.3) |
| B-5 | MSA- 7(100) | | T-190(5) | (0.3) |
| B-6 | MSA- 9(100) | | T-190(5) | (0.3) |
| B-7 | MSA-10( 80) | Acrylic copolymer (Note 5) (20) | T-294(5) | (0.3) |
| B-8 | MSA-11( 70) | Polyvinyl alcohol (Note 6) (30) | PX- 3(5) | (0.3) |
| B-9 | MSA-12(100) | | PX- 3(5) | (0.3) |

(Note 1) In all cases the specially modified polyvinyl alcohol is the same polymer as that used in Example 1. The symbol X in the designation MSA-X in the table stands for the Trial No. in Table 1 and the analyses of the polymers are as set forth in Table 1.
(Note 2) PX-7: Higher aliphatic sulfate
T-190: Sitex® T-190, Go-oh Kagaku K.K.
T-294: Sitex® T-294, Go-Oh Kagaku K.K.
(Note 3) Pionion® K-16, Takemote Yushi Yakuhin Co., Ltd.
(Note 4) Degree of polymerization 550, degree of saponification 88.0 mole %
(Note 5) Plus-size® R-823, Go-oh Kagaku, K.K.
(Note 6) Degree of polymerization 550, degree of saponification 79.5 mole %

EXAMPLE 10

A size solution was prepared from an itaconic acid-modified polyvinyl alcohol (according to the designations given in Example 1, $\Delta=3$, (DP)app.=650, (DS)app=83) as the principal size and was used to size polyester filaments. The physical properties of the sized fiber were also determined. As a control, an acrylate-based compound size solution, which is commercially employed today, was similarly tested.

The fiber used was polyester filament yarn (Clavella® CF-140, SD75 dr-36 fil, Kuraray Co., Ltd.).

The size solution was prepared from 100 parts of the principal size (on a dry-weight basis), 5 parts of a lubricant and 0.3 part of an antifoam to each 1000 parts of water, by dissolution at 90° C. for one hour. The solubility and the anti-foam characteristics were satisfactory.

The size solution was transferred to the size box of a double-roller sizing machine, where the above-mentioned polyester filaments were sized at 40° C. The target sizing amount was 7–8% o.w.f. (pickup per unit weight of fiber). The sizing operation could be satisfactorily accomplished without troubles in connection with the foaming of the size solution, the repellency of the rollers, the caking of the size, the formation of the surface film, etc. The post-drying yarn-dividing performance was also good, with no filament breaks, fluffing and other troubles.

The physical properties of the sized fiber were then evaluated by the yarn running test. In this test, the sized fiber was caused to travel at the speed of 100 m/min. for 10 minutes. At intermediate stages, the yarn was caused to run frictionally over dropper pins and a couple of black velvet cloths and the amount of gum-up at the dropper and the pickups of the size by the velvet cloths were visually examined.

The evaluation results are shown in Table 3. It will be seen that the properties of yarn sized by the size of this invention are at least comparable to the properties of similar yarn sized with the commercial acrylate size.

Table 3

| Size | Trial No. | Running test data on sized yarns | | | |
|---|---|---|---|---|---|
| | | No of yarn breaks | Gum-up at dropper | Removal of size at dropper | Pickup of size by velvet cloth |
| Size of this invention* | 1 | 0 | None | Little | Little |
| | 2 | 0 | " | Moderate | Moderate |
| | 3 | 1 | " | Little | Little |
| Acrylate Size** | 1 | 1 | None | Little | Moderate |
| | 2 | 2 | Little | Moderate | Moderate |
| | 3 | 0 | None | Little | Moderate |

*Principal size 100 parts (itaconic acid modified polyvinyl alcohol; $\Delta=3$ according to the indication of Example 1) Lubricant 5 parts (PX-7; higher aliphatic sulfate) Anti-foam 0,.3 part (Pionin® K-16, Takemoto Yushi Yakuhin Co., Ltd.
**Principal size 100 parts: Polyvinyl alcohol (degree of polymerizaton 550, degree of saponification 88.0 mole %) 40 parts Plus-size® T-823; acrylic copolymer, Go-oh Kagaku, K.K. 60 parts Lubricant 5 parts: Sitex® T-190, Go-oh Kagaku K.K.

Then, using this sized yarn, a plain-weave fabric was constructed on a test weaving machine and a desizing test was performed.

Thus, the woven fabric (12 cm×20 cm) was dried at 130° C. for 30 minutes and, then, allowed to stand in a desiccator containing silica gel for 15 minutes. The dry weight $W_2$ of the yarn was determined. The fabric was immersed in distilled water (80° C.), the amount of which was 500 times the weight of the fabric, for a period of 10 minutes. It was then rinsed with about 2000 times of its weight of water for one minute, dried at 130° C. for 30 minutes and allowed to stand in a desiccator for 15 minutes. Then, the dry weight ($W_3$) was determined. The percent size pickup was calculated by means of the following equation.

$$\text{Size pickup (\%)} = \frac{W_2 - W_3}{W_3} \times 100$$

Then, a 1/300 N-boric acid saturated iodine solution was dripped onto the desized fabric and, after drying, the change in hue was assessed by comparison with the standard hue to obtain the percent size residue. In all cases, the results were in the range of 0.001 to 0.003%, the desizing efficiencies being not less than 99.5%.

EXAMPLE 11

100 kg of the same itaconic acid-modified polyvinyl alcohol as used in Example 10 was dispersed and dissolved in 1500 l of water and 5 kg (as pure) of Makonol® TS-253 (Matsumoto Yushi Seiyaku Co., Ltd.) was added. Using the resultant size solution, the following yarn was sized and woven under the conditions set forth below.

Sizing conditions:
Substrate yarn: Kuraray ester/cotton=65/35, 45'S/1
Type: broad cloth
Density (136 warps, 71 fillings)
Width of gray cloth: 37
Temperature of size (°C.): 85
Drying temperature (°C.): 100
Sizing speed (Y/min.): 45
Amount of size gray cloth (tan*): 80
tan* means a Japanese units of measure of a roll of cloth (of about 50 meters).

The sizing workability was excellent, without the formation of size scums skinning of the size solution or other troubles. The divisibility of the sized yarn was also satisfactory and the yarn could be woven with a high weaving efficiency, being free from yarn breaks, fluffing, wale streaks, etc. The fabric was desized, scoured and dyed to obtain a pink-colored fabric. This finished fabric had no dyeing specks and was judged to have been well desized.

Weaving results:
No. of yarn breaks (per hour): 0.28
Weaving efficiency (%): 91.6

EXAMPLE 12

100 kg of an itaconic acid-modified polyvinyl alcohol ($\Delta=2$, (DP)app=1500 and (DS)app=94 according to the indication of Example 1), 60 kg of corn starch, 25 kg of carboxymethyl-cellulose and 5 kg of Makonol® TS-253 (Matsumoto Yushi Seiyaku Co., Ltd.) were dispersed and dissolved in 1800 l of water to prepare a size solution. Using this size solution, the sizing and weaving test was performed under exactly the same conditions as in Example 11.

The sizing processability and the properties of sized yarn were both satisfactory.

Weaving results:
No. of yarn breaks (per hour): 0.31
Weaving efficiency (%): 90.8

What we claimed is:

1. A size for textile fibers, which comprises: a modified polyvinyl alcohol resin obtained by alkali saponification of a copolymer which is obtained by copolymerization of a monomer mixture comprising a vinyl ester and an ethylenically unsaturated dicarboxylic acid as essential and predominant comonomers, wherein said monomer mixture is free of monoester, diester and anhydride derivatives of said dicarboxylic acid, and wherein the proportion of said dicarboxylic acid component in said copolymer is in the range of from 0.1 to 10 mole percent.

2. The size for textile fibers as set forth in claim 1 wherein said ethylenically unsaturated dicarboxylic acid component is itaconic acid.

3. The size for textile fibers as set forth in claim 1 wherein said ethylenically unsaturated dicarboxylic acid is selected from the group consisting of maleic acid and fumaric acid.

4. The size for textile fibers as set forth in claim 1 wherein the degree of saponification of said modified polyvinyl alcohol resin is not less than 30 mole percent.

5. The size for textile fibers as set forth in claim 1 wherein the degree of saponification of said modified polyvinyl alcohol resin is in the range of 30 to 95 mole percent, said size being especially suited for sizing filament fibers.

6. The size for textile fibers as set forth in claim 1 wherein the degree of saponification of said modified polyvinyl alcohol resin is in the range of 70 to 100 mole percent, said size being especially suited for sizing staple fibers.

* * * * *